B. M. ASLAKSON.
MILKING MACHINE.
APPLICATION FILED NOV. 2, 1911.
1,048,481.
Patented Dec. 31, 1912.
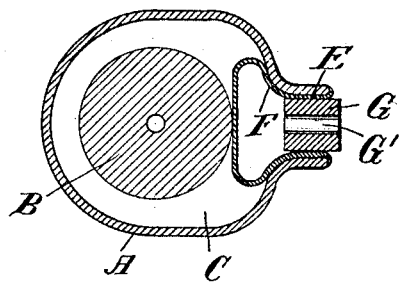
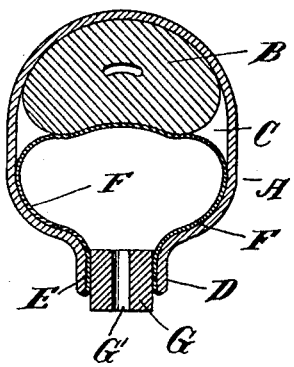
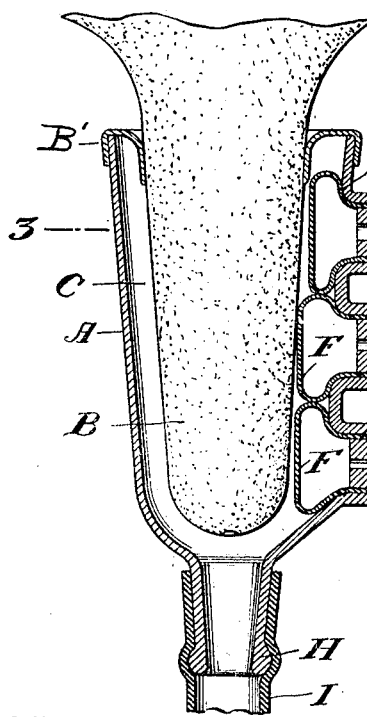
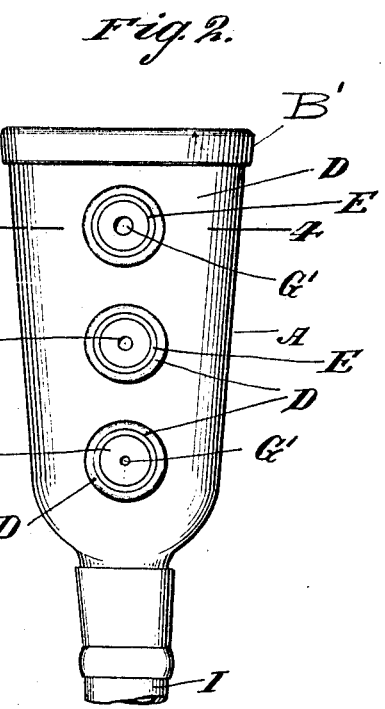
Witnesses:
Inventor
Baxter M. Aslakson
By his Attorney

UNITED STATES PATENT OFFICE.

BAXTER M. ASLAKSON, OF SALEM, OHIO.

MILKING-MACHINE.

1,048,481. Specification of Letters Patent. Patented Dec. 31, 1912.

Application filed November 2, 1911. Serial No. 658,133.

*To all whom it may concern:*

Be it known that I, BAXTER M. ASLAKSON, a citizen of the United States, and a resident of Salem, in the county of Columbiana and State of Ohio, have invented certain new and useful Improvements in Milking-Machines, of which the following is a specification.

My invention relates to milking machines and the object of my invention is to provide a milking cup for use with a pump and coöperating mechanism which is adapted to create a rarefaction within the cup, which pump and mechanism forms no part of the present invention.

Further objects of my invention will be hereinafter more fully set forth and the novel features of construction pointed out in the claims.

Referring to the drawings, Figure 1 is a vertical sectional view through a milking cup embodying my invention. Fig. 2 is an exterior view of the milking cup. Fig. 3 is a cross section of the cup on line 3—3 of Fig. 1, and Fig. 4 is a cross sectional view on line 4—4 of Fig. 2 disclosing one of the expanding sacks in its expanded position.

A, indicates the cup body which may be made of glass or some light metal such as aluminum and is of larger diameter at its upper end than at its lower, being shaped somewhat like a cone and having its upper and lower ends initially open. Fitted to the upper end of the cup A is a soft, elastic rubber ring B', the inner portion of which depends or dips within the cup a short distance and is adapted to embrace the teat B of the cow, and prevent air from flowing through the ring within the chamber C.
The cup body is provided with a plurality of annular rings D—D etc. located in alinement and one above the other thus providing openings E—E—E respectively, which are initially in open communication with the chamber C. Sacks F—F—F respectively are held in the openings E—E—E respectively by inserting a tube G in each of the openings E and clamping the open ends of the sacks F between the plug and the inner walls of the ring D. Each of the tubes G are provided with openings G', the opening in the upper tube being larger than the opening in the adjacent tube and the lowest tube having the smallest opening. The lower end of the cup is provided with a neck portion H over which a tube I is fitted which tube extends to the pumping mechanism heretofore referred to.

The operation of the device is as follows:—The pumping mechanism is arranged to alternately create a partial vacuum in the cup chamber C amounting to about 14 inches of mercury, which when the lower end of the cow's teat is placed within the ring B', draws the teat within the cup as illustrated in Fig. 1 and immediately thereafter the air flowing through the openings G' expands the sacks F against the teat and forcing the milk from the upper part thereof successively through the same. The successive action is caused by reason of the difference of diameter of the openings G'. The upper opening being of larger diameter than the next lower, permits the upper sack to expand first, then the second sack and finally the lowest sack, and when the vacuum is destroyed in the chamber C by admitting air to flow back through the tube I into the chamber C, the upper sack will collapse first and the adjacent sack will next collapse, so that by the time the last sack has collapsed the milk has again flowed from the udder and fill the teat, so that the next rarefaction in the chamber C will cause the sack F to again expand and trap milk below the same to be successively forced therefrom by the successive actions of the lower sacks as will be readily understood. This alternate suction and atmospheric pressure inside the cup takes place about 50 times a minute. The cup acts in a perfectly natural way of drawing the milk resembling exactly the method of the calf which is suction plus the pressure with the gums, and it is believed that any person skilled in the art will have no difficulty in understanding the construction and operation of this improved machine.

Having thus described my invention, I claim as new:—

1. A milking cup comprising a body portion having a chamber therein adapted to receive the teat of a cow and the top portion of which is formed to embrace said teat and provided with a plurality of openings in one side thereof, a sack in each of said openings having an air passage adapted to expand the same against said teat to force milk therefrom, the opening leading within the upper sack being of larger diameter than the opening leading to the adjacent sack.

2. A milking cup comprising a body portion having a chamber therein adapted to receive the teat of a cow and the top portion of which is formed to embrace said teat and provided with a plurality of openings in one side thereof, a plurality of expansible sacks, each of which has a neck located in said opening, a tube for each of said sacks which serves to hold same in said openings, the upper of said tubes having a passage for air of larger area than the next adjacent tube, substantially as set forth.

3. In a milking machine, a teat receiver having a body portion, a top portion adapted to closely embrace the teat adjacent to its root, and a connection at the bottom of the receiver adapted to extend to an air exhausting apparatus, said body portion having a plurality of expansible sacks arranged longitudinally thereof, said sacks being adapted to expand against the teat and force the milk therefrom, said sacks being open to the atmosphere through openings decreasing in size from the sack nearest the top portion to the sack nearest the bottom portion of the receiver.

4. A milking cup comprising a body portion having a chamber therein adapted to receive the teat of a cow and provided with a plurality of openings arranged one above the other, a sack in each of said openings having an air passage adapted to expand the same against said teat to force milk therefrom, the opening leading within the upper sack being of larger diameter than the opening leading to the adjacent sack.

5. A milking cup comprising a body portion having a chamber therein adapted to receive the teat of a cow and the top end of which is provided with a flexible portion formed to embrace said teat and provided with a plurality of openings in one side thereof, a sack in each of said openings having an air passage adapted to expand the same against said teat to force milk therefrom, the opening leading within the upper sack being of larger diameter than the opening leading to the adjacent sack.

Signed at Des Moines, in the county of Polk and State of Iowa, this 24th day of October A. D. 1911.

BAXTER M. ASLAKSON.

Witnesses:
 MARY WALLACE,
 BESSIE E. DEAL.